United States Patent [19]

Harada et al.

[11] 4,312,569
[45] Jan. 26, 1982

[54] CONCAVE GRATINGS

[75] Inventors: Tatsuo Harada, Fuchu; Toshiaki Kita, Hinodemachi, both of Japan

[73] Assignee: Hitachi, Ltd., Tokyo, Japan

[21] Appl. No.: 139,549

[22] Filed: Apr. 11, 1980

[30] Foreign Application Priority Data

Apr. 13, 1979 [JP] Japan .................................. 54-44152

[51] Int. Cl.³ ............................................... G02B 5/18
[52] U.S. Cl. ............................................... 350/162 R
[58] Field of Search ............... 350/162 R; 250/237 G; 356/305, 328, 329, 334

[56] References Cited

U.S. PATENT DOCUMENTS 4,012,843 3/1977 Harada et al. ....................... 33/19 A

OTHER PUBLICATIONS

Namioka, T,; "Theory of the Concave Grating III Seya-Namioka Monochromator"; Josa, vol. 49, No. 10, Oct. 1959, pp. 951-961.

*Primary Examiner*—John K. Corbin
*Assistant Examiner*—Bruce Y. Arnold

*Attorney, Agent, or Firm*—Craig and Antonelli

[57] ABSTRACT

A concave grating having grooves formed in a concave blank surface in which the grooves are so formed as to have a non-uniform, spacing in accordance with the following relationship:

$$\sigma = \sigma_o - \sigma_o \left\{ 2b_1\left(\frac{w}{R}\right) + 3b_2\left(\frac{w}{R}\right)^2 + 4b_3\left(\frac{w}{R}\right)^3 \right\}$$

wherein
- $b_1$, $b_2$ and $b_3$ represent constants;
- $\sigma_o$ represents groove spacings at the center of the gratings when the grooves are projected onto a plane which is in contact with a concave surface at the center of the gratings;
- $\sigma$ represents groove spacings at positions w at right angles with the lines from the center of the gratings to the grooves; and
- R represents a radius of curvature of the concave surface.

4 Claims, 12 Drawing Figures

FIG. 5(a)      FIG. 5(b)
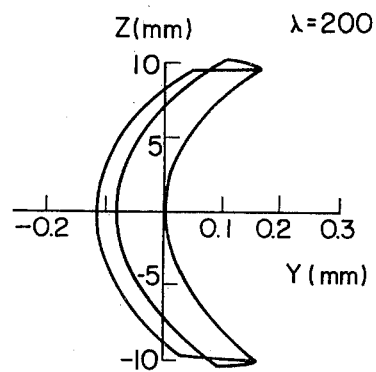
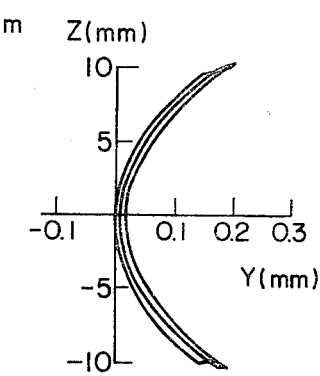
FIG. 6(a)      FIG. 6(b)
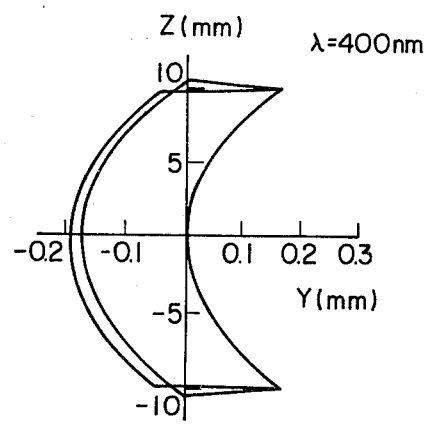
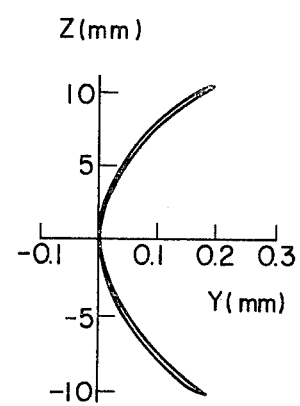

λ=600nm

λ=800nm

CONCAVE GRATINGS

BACKGROUND OF THE INVENTION

The present invention relates to concave gratings in which grooves are formed while changing groove spacings according to a predetermined function.

Among the monochrometers which have been used for the spectroscopic analyses of ultraviolet rays, visible rays and near infrared rays, the Seya-Namioka monochromator, as disclosed in the Journal of the Optical Society of America, Volume 49, No. 10, October, 1959, pp. 951-961, features of a very simple construction employing a concave grating having grooves which are formed in the concave surface. This device covers a wide spectral region and has been extensively used for vacuum ultraviolet applications, as well as visible and ultraviolet applications. The Seya-Namioka monochromator, however, presents a greater abberation during the focusing operation than monochromators which employ plane gratings or those other monochromators which employ concave gratings.

SUMMARY OF THE INVENTION

The present invention is directed to the above-mentioned problem, and its object is to provide concave gratings having a very small aberration, which are adapted to the Seya-Namioka monochromator.

In order to achieve this object, the present invention deals with a concave grating formed by a concave surface having grooves which are so formed as to satisfy the following relation:

$$\sigma = \sigma_0 - \sigma_0 \left\{ 2b_1 \left(\frac{w}{R}\right) + 3b_2 \left(\frac{w}{R}\right)^2 + 4b_3 \left(\frac{w}{R}\right)^3 \right\}$$

wherein
- $b_1$, $b_2$ and $b_3$ represent constants;
- $\sigma_0$ represents groove spacings at the center of the gratings when the grooves are projected onto a plane which is in contact with the concave surface at the center of the gratings;
- $\sigma$ represents groove spacings at positions w at right angles with the lines from the center of the gratings to the grooves; and
- R represents a radius of curvature of the concave surface.

BRIEF DESCRIPTION OF THE DRAWINGS

FIGS. 5a through 8b are diagrams of characteristic curves illustrating the effects of the concave gratings of the present invention.

DETAILED DESCRIPTION OF THE PREFERRED EMBODIMENTS

The invention is illustrated below in detail with reference to an exemplary embodiment.

Figure 1:
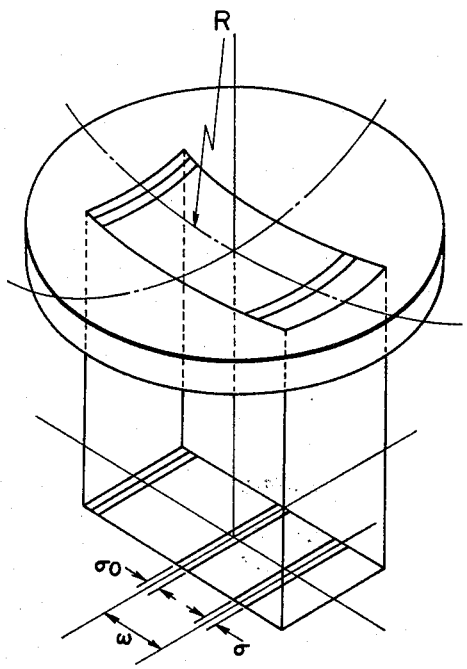
FIG. 1 is a schematic diagram of a concave grating according to the present invention.

FIG. 1 is a schematic diagram of a concave grating constructed in accordance with the present invention in which grooves are formed in a spherical surface having a radius of curvature R. According to the present invention, a grating is provided in which the grooves have groove spacings $\sigma_0$ at the center of the grating and groove spacings $\sigma$ at positions separated by a distance w from the center, with the grooves being projected onto a plane which is in contact with the spherical surface of the blank at the center of the grating.

Figure 2:
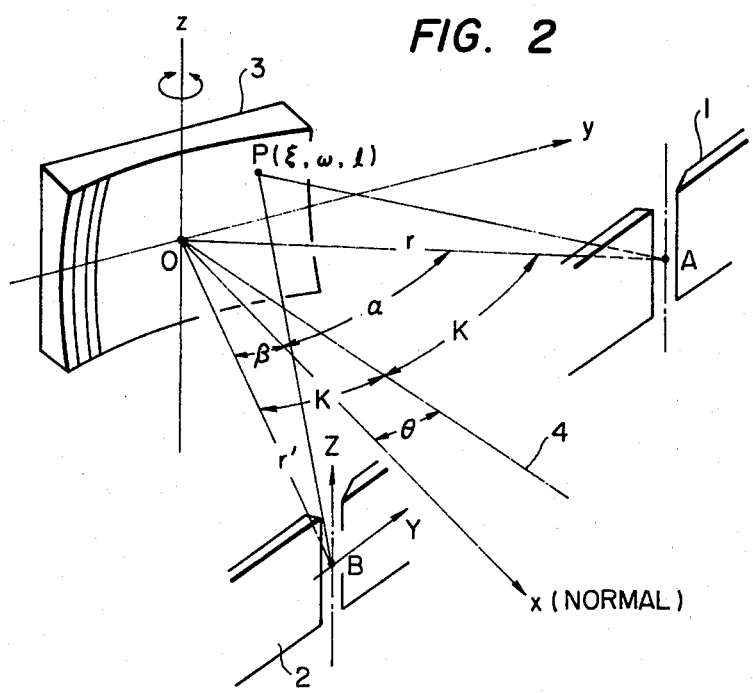
FIG. 2 is a diagram illustrating the Seya-Namioka monochromator.

FIG. 2 shows the Seya-Namioka monochromator to which is applied the concave gratings of the present invention. In this arrangement an entrance slit 1 and an exit slit 2 are held stationary, and the grating 3 is rotated to take out monochromatic light of different wavelengths. In FIG. 2 the axis x represents the normal of the grating sphere which passes through a center O of the concave gratings, the axis z runs parallel with the grooves, and the axis y runs at right angles to the grooves. The distances from the center A and B of the entrance slit 1 and the exit slit 2 to the center O of the grating 3 are denoted by r and r', respectively, the angle AOB is equal to 2K, the angles of the axis x subtended by lines AO and BO are denoted by $\alpha$ and $\beta$, respectively, and the angle of the bisector 4 of the angle AOB subtended by the axis x is denoted by $\theta$. Further, it is assumed that the angles on the side of $\alpha$ with the axis x as a reference have positive values. With the Seya-Namioka monochromator in which the distances r, r' and angle $2K = \alpha - \beta$ ($\beta$ being a negative angle) remain constant, the wavelengths can be scanned by rotating the grating 3 about the axis Z.

A light path function F of the light of wavelength $\lambda$ emitted from a point light source A, diffracted at a given point P ($\xi$, w l) on the grating surface, and received by a point B, is defined by $$F = AP + BP + nm\lambda \qquad (1)$$

The symbols AP and BP denote the distances between points A and P and between the points P and B, respectively, m denotes the diffraction order, and n denotes the number of grooves from the center O of the grating 3 to the point P. Thus, when a concave grating having varying groove spacings is used, as in the present invention, the number of grooves is approximately given by adding the higher order values of w, $$n = a_1 w + a_2 w^2 + a_3 w^3 + a_4 w^4 + \qquad (2)$$

wherein $a_1$, $a_2$, $a_3$, $a_4$, ... denote coefficients.

Here, $a_1$ represents the number of grooves per 1 mm at the center of the grating 3, which is an inverse number of the groove spacings $\sigma_0$. If the equation (1) is modified by substitution of the equation (2) to eliminate n, there is obtained the following equation:

$$F = AP + BP + m\lambda(a_1 w + a_2 w^2 + a_3 w^3 + a_4 w^4 + \qquad (3)$$

Symbol P represents a point on a spherical surface of a radius of curvature R, and $\xi$ is given by a function of w, l and R. Therefore, if F of the equation (3) is expanded into a power series of $w^i l^j$, $$F = r + r' + wF_{10} + \tfrac{1}{2}w^2 F_{20} + \tfrac{1}{2}l^2 F_{02} + \tfrac{1}{2}w^3 F_{30} + \tfrac{1}{2}wl^2 F_{12} + \tfrac{1}{8}w^4 F_{40} + \tfrac{1}{8}l^4 F_{04} + \text{(terms of higher order)} \quad (4)$$

Here, suffixes i and j of $F_{ij}$ correspond to exponents of $w^i l^j$. When the conventional concave gratings having grooves formed on the spherical surface maintaining equal spacings are used, the light path function F is given by the equation (3) with $a_2 = a_3 = a_4 = \ldots$ being zero. Referring to the equation (4), the coefficient $F_{ij}$ related to l is the same even when the concave grating of the present invention is used or the conventional concave grating is used. Accordingly, to analyze the effects of the concave grating of the present invention, a two-dimensional concave grating with a groove length O should be taken into consideration. Supposing that $l = O$ in the equation (4), the light path function F in this case is given by $$F = r + r' + wF_{10} + \tfrac{1}{2}w^2 F_{20} + \tfrac{1}{2}w^3 F_{30} + \tfrac{1}{8}w^4 F_{40} + \text{(terms of higher order)} \quad (5)$$

$$F_{10} = -(\sin\alpha + \sin\beta) + a_1 m\lambda \quad (6)$$

$$F_{20} = \frac{\cos^2\alpha}{r} - \frac{\cos\alpha}{R} + \frac{\cos^2\beta}{r'} - \frac{\cos\beta}{R} + 2a_2 m\lambda \quad (7)$$

$$F_{30} = \frac{\sin\alpha \cdot \cos^2\alpha}{r^2} - \frac{\sin\alpha \cdot \cos\alpha}{Rr} + \frac{\sin\beta \cdot \cos^2\beta}{r'^2} - \frac{\sin\beta \cdot \cos\beta}{Rr'} + 2a_3 m\lambda \quad (8)$$

$$F_{40} = \frac{\cos^2\alpha}{r^3}(5\sin^2\alpha - 1) + \frac{2\cos\alpha}{Rr^2}(1 - 3\sin^2\alpha) + \frac{\sin^2\alpha}{R^2 r} - \frac{\cos\alpha}{R^3} + \frac{\cos^2\beta}{r'^3}(5\sin^2\beta - 1) + \frac{2\cos\beta}{Rr'^2}(1 - 3\sin^2\beta) + \frac{\sin^2\beta}{R^2 r'} - \frac{\cos\beta}{R^3} + 8a_4 m\lambda \quad (9)$$

whereby only the terms $w^i$ are left.

From Fermat's principle, the aberration in the direction of the wavelengths in the plane x-y of the concave grating becomes O when, $$\partial F/\partial w = O \quad (10)$$

If terms of the higher order are neglected, the equation (10) is satisfied when $$F_{10} = F_{20} = F_{30} = F_{40} = 0 \quad (11)$$

as will be obvious from the equation (5). Here, $F_{10}$ gives a fundamental formula of the gratings for determining the direction of spectrum and may be considered to be always 0.

According to the present invention, $F_{20} = F_{30} = F_{40} = 0$ at predetermined wavelengths, and $F_{20}$, $F_{30}$ and $F_{40}$ become minimum over a wide range of wavelengths, whereby it is made possible to find conditions for forming grooves which help minimize the aberration in the direction of the wavelengths.

According to the Seya-Namioka monochromator, as mentioned earlier, $$\left.\begin{array}{l} r, r' = \text{constant}, 2K = \alpha - \beta = \text{constant} \\ \alpha = K + \theta, \beta = \theta - K \end{array}\right\} \quad (12)$$

Further, from the fundamental equation of the gratings, $$m\lambda/\sigma_o = \sin\alpha + \sin\beta = 2\sin\theta \cdot \cos K \quad (13)$$

where $\sigma_o = 1/a_1$ in the groove spacings at the center of the grating.

Under these conditions, unknown quantities $a_2$, $a_3$ and $a_4$ should be determined using equations (7), (8), and (9) such that $F_{20}$, $F_{30}$ and $F_{40}$ become 0, respectively.

The number of grooves $a_1$ per 1 mm at the center and the radius of curvature R which are fundamental specifications for the concave grating, are suitably selected depending upon the specifications of the spectrophotometer. Therefore, unknown quantities $a_2$, $a_3$ and $a_4$ should be desirably be normalized utilizing $a_1$ and R. New dimensionless variables are then given by, $$b_1 = \frac{a_2}{a_1} R, \quad b_2 = \frac{a_3}{a_1} R^2, \quad b_3 = \frac{a_4}{a_1} R^3 \quad (14)$$

Figure 3:
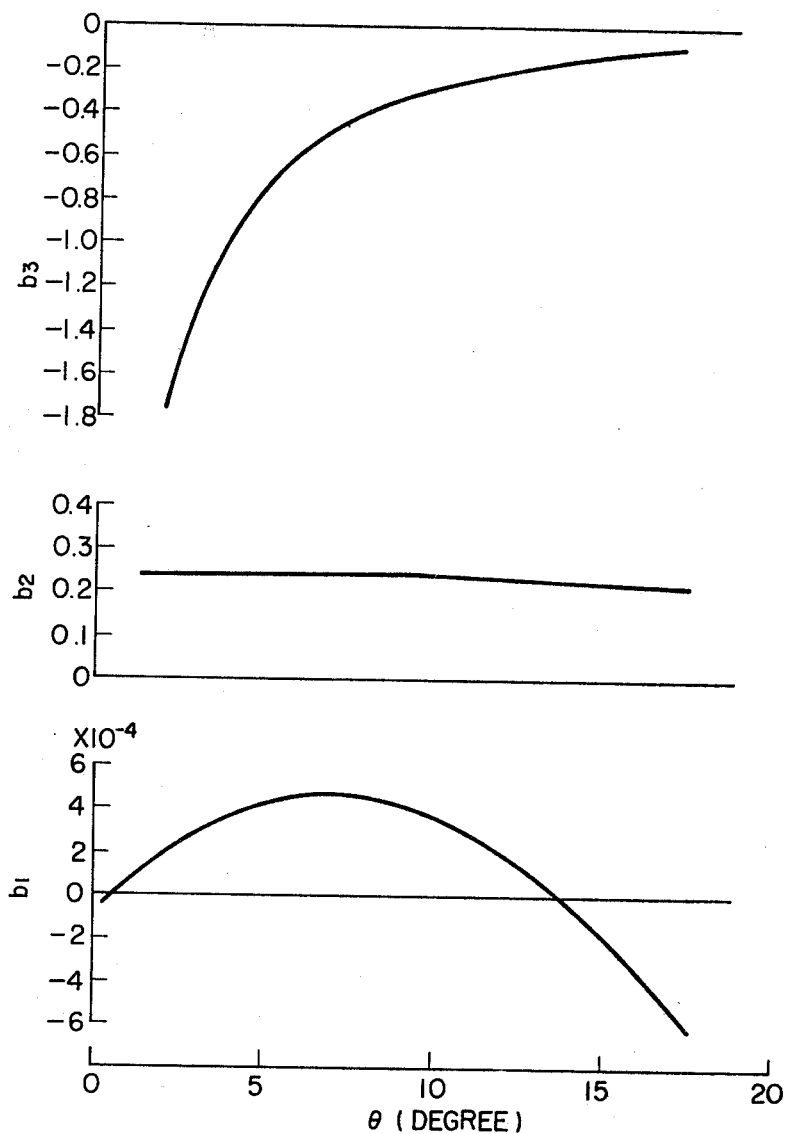
FIG. 3 shows characteristic curves for illustrating the requirements for forming grooves of the concave gratings of the present invention.

FIG. 3 shows the relations between the angle $\theta$ of the gratings and $b_1$, $b_2$ and $b_3$ by which $F_{20}$, $F_{30}$ and $F_{40}$ become zero, respectively, by utilizing $R/r = 1.22205$, $R/r' = 1.22296$ and $2K = 70°15'$, as dimensions for the popular optical measure of the Seya-Namioka monochromator.

It is considered that the practical range of rotating angles $\theta$ of the grating in the Seya-Namioka monochromator is $0 \leq \theta \leq 18°$. As will be obvious from FIG. 3, preferable ranges of groove-forming conditions $b_1$, $b_2$ and $b_3$ of the concave grating that will be used for the Seya-Namioka monochromator which covers the above-mentioned range of angles, are as given below.

$$\left.\begin{array}{l} -6.1 \times 10^{-4} \leq b_1 \leq 4.4 \times 10^{-4} \\ 0.22 \leq b_2 \leq 0.24 \\ -1.8 \leq b_3 \leq -0.09 \end{array}\right\} \quad (15)$$

The concave grating of the present invention should preferably be prepared by a numerically-controlled ruling engine, such as disclosed in U.S. Pat. No. 4,012,843, which was invented by the inventors of the present invention. In this case a numerically-controlled tape for controlling the feed of the blank will be necessary so that the grooves are ruled while maintaining predetermined spacings. In forming the grooves, however, the groove-forming conditions should be modified to provide groove spacings in accordance with the number of grooves specified by the equation (2). The groove spacings $\sigma$ can be given by a differential value, $$\sigma = dw/dn \quad (16)$$

with respect to the number of grooves n at the groove positions w. By differentiating the equation (2) by w, $$dn/dw = a_1 + 2a_2 w + 3a_3 w^2 + 4a_4 w^3 + \quad (17)$$

Substituting the equation (16) by the equation (17), $$\sigma = \frac{1}{a_1 + 2a_2 w + 3a_3 w^2 + 4a_4 w^3 + \ldots} \quad (18)$$

Neglecting terms w of the order higher than the fourth order, and utilizing $b_1$ and $b_2$ of the equation (14), $$\sigma = \cfrac{1}{a_1\left\{1 + 2b_1\left(\cfrac{w}{R}\right) + 3b_2\left(\cfrac{w}{R}\right)^2 + 4b_3\left(\cfrac{w}{R}\right)^3\right\}} \quad (19)$$

In the practical concave grating, $w \ll R$, whence, $$1 \gg 2b_1\frac{w}{R} + 3b_2\left(\frac{w}{R}\right)^2 + 4b_3\left(\frac{w}{R}\right)^3 \quad (20)$$

Further, by using $1/a_1 = \sigma_o$, $$\sigma = \sigma_o - \sigma_o\left\{2b_1\left(\frac{w}{R}\right) + 3b_2\left(\frac{w}{R}\right)^2 + 4b_3\left(\frac{w}{R}\right)^3\right\} \quad (21)$$

Figure 4:
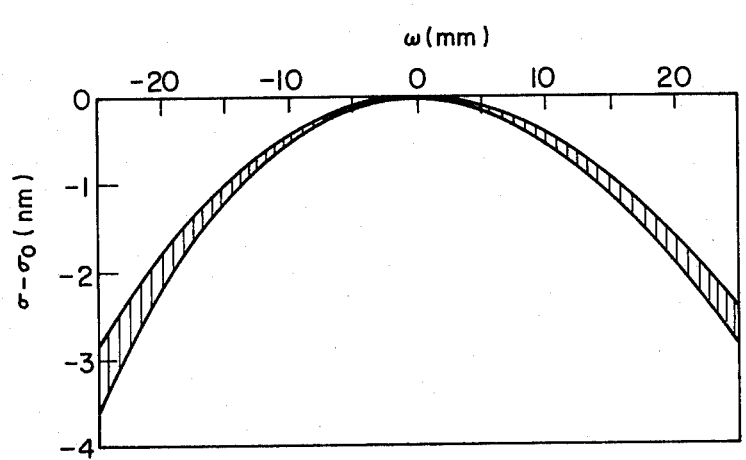
FIG. 4 is a diagram of characteristic curves illustrating an example of the change in groove spacings in the concave gratings of the present invention.
Figure 7A:
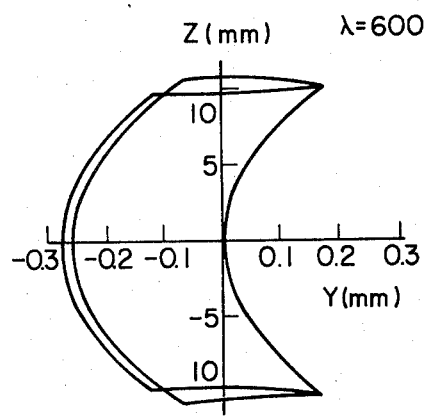
Figure 7B:
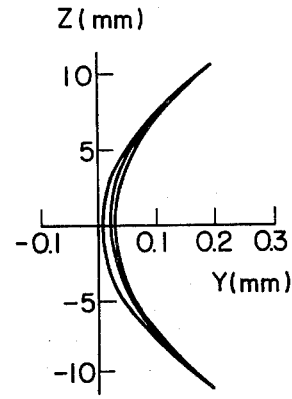
Figure 8A:
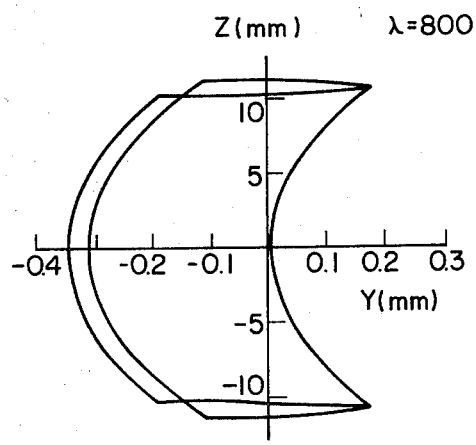
Figure 8B:
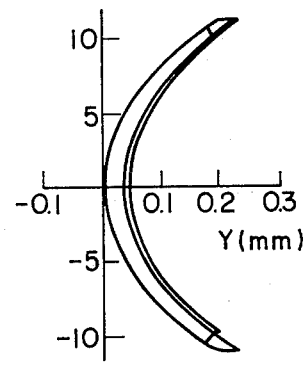

FIG. 4 shows a preferable range in the change in groove spacings when the thus-found number of grooves $a_1$ of the concave grating is 600/mm and the radius of curvature is R=500 mm.

It will now be described in conjunction with FIGS. 5 to 8 how the concave gratings produced according to the present invention provide improvement with regard to aberration.

Diagrams (b) of FIGS. 5 to 8 illustrate images diffracted by the concave grating of the present invention when the number of the grooves at the center is set to be $a_1 = 600$/mm, the radius of curvature is R = 500 mm, the ruled area is 50 (width)×30 (length) mm, the wavelength range is $0 \leq \lambda \leq 800$ nm, $b_1$ is $4.31219 \times 10^{-4}$, $b_2$ is 0.23850 and $b_3$ is $-0.35164$, and when the primarily diffracted lights of wavelengths of $\lambda = 200$ nm, 400 nm, 600 nm, and 800 nm are emitted from the point light source which is located at the center of the entrance slit. Diagrams (a) of FIGS. 5 to 8 illustrate images diffracted by the conventional concave grating having grooves which are equally spaced. In the drawings Y and Z represent a coordinate system of FIG. 2 with a point B as the origin. As will be obvious from the drawings, the images diffracted by the concave grating of the present invention are spread very little in the direction of the axis Y (in the direction of the width of the waves), indicating that the aberration is strikingly improved.

In the case of a spectroscope, unlike the lens systems which are symmetrical with respect to an axis, the astigmatism of the diffracted image in the direction of the axis Z does not give so serious a problem as compared with the width in the direction of the axis Y, but results in the loss of a quantity of light. The foregoing description has dealt with a concave grating in which the grooves are formed on a spherical surface. However, if the grooves formed in the concave grating of the present invention are formed on a non-spherical surface, such as toroidal surface having dissimilar radii of curvature in a horizontal plane and in a vertical plane, the astigmatism of the image can be improved in the direction of the axis Z.

As will be apparent from the foregoing description, the concave grating of the present invention helps strikingly to reduce aberration as compared with conventional concave gratings. Therefore, by simply employing the grating of the present invention for the Seya-Namioka monochromator, the resolving power can be increased to such an extent that it is superior to any performance every achieved by the conventional counterparts, thus presenting great practical effects.

The above-mentioned embodiment has dealt with the case when the concave grating of the present invention was applied to the Seya-Namioka monochromator in which the angle 2K is nearly 70°. The concave grating of the present invention should not necessarily be limited to the above embodiment only, but can be applied to those in which the angle 2K lies over a range of 140° to 170°, by suitably finding the coefficients $b_1$, $b_2$ and $b_3$ from the equations (6) to (9) to obtain the same effects.

What is claimed is:

1. In a concave grating having grooves formed in a concave blank surface, the improvement characterized by the provision of grooves in the concave surface which are so formed as to satisfy the following relationship:

$$\sigma = \sigma_o - \sigma_o\left\{2b_1\left(\frac{w}{R}\right) + 3b_2\left(\frac{w}{R}\right)^2 + 4b_3\left(\frac{w}{R}\right)^3\right\}$$

wherein $b_1$, $b_2$ and $b_3$ represent constants;

$\sigma_o$ represents groove spacings at the center of the gratings when the grooves are projected onto a plane which is in contact with a concave surface at the center of the grating;

$\sigma$ represents groove spacings at positions w at right angles with the lines from the center of the grating to the grooves; and R represents a radius of curvature of the concave surface.

2. A concave grating according to claim 1, wherein the constants $b_1$, $b_2$ and $b_3$ in said relation satisfy the following requirements, $-6.1 \times 10^{-4} \leq b_1 \leq 4.4 \times 10^{-4}$ $0.22 \leq b_2 \leq 0.24$ $-1.8 \leq b_3 \leq -0.09$ 3. A concave grating according to claims 1 or 2, wherein the concave surface is a spherical surface.

4. A concave grating according to claims 1 or 2, wherein the concave surface is a non-spherical surface.

* * * * *